(12) United States Patent
Lee et al.

(10) Patent No.: US 10,814,658 B2
(45) Date of Patent: Oct. 27, 2020

(54) SYSTEM AND METHOD FOR MARKING AT OPTICAL FILM

(71) Applicant: LG CHEM, LTD., Seoul (KR)

(72) Inventors: Beom-Seok Lee, Daejeon (KR); Kyu-Sung Hwang, Daejeon (KR); Eung-Jin Jang, Daejeon (KR); Hang-Suk Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 197 days.

(21) Appl. No.: 16/076,183

(22) PCT Filed: Jan. 6, 2017

(86) PCT No.: PCT/KR2017/000227
§ 371 (c)(1),
(2) Date: Aug. 7, 2018

(87) PCT Pub. No.: WO2017/171209
PCT Pub. Date: Oct. 5, 2017

(65) Prior Publication Data
US 2020/0207133 A1     Jul. 2, 2020

(30) Foreign Application Priority Data
Apr. 1, 2016 (KR) .................. 10-2016-0040290

(51) Int. Cl.
*B41M 3/00* (2006.01)
*B41J 2/44* (2006.01)
(Continued)

(52) U.S. Cl.
CPC .............. *B41M 3/003* (2013.01); *B41J 2/442* (2013.01); *B41J 2/47* (2013.01); *G02B 5/3033* (2013.01)

(58) Field of Classification Search
CPC ... B41J 2/47; B41J 2/442; B41F 21/00; B41F 33/0036; B41M 3/003; G02B 5/285;
(Continued)

(56) References Cited

U.S. PATENT DOCUMENTS 9,671,352 B2   6/2017 Woo et al.
2004/0169920 A1 * 9/2004 Uehara .................. G02B 30/27
                                                          359/443
(Continued)

FOREIGN PATENT DOCUMENTS

CN      1890082 A     1/2007
CN    102608684 A     7/2012
(Continued)

*Primary Examiner* — Anh T Vo
(74) *Attorney, Agent, or Firm* — Dentons US LLP

(57) ABSTRACT

Disclosed is a system and method for marking at a partial area of an optical film material. The system for marking at an optical film includes a feed roll configured to feed an optical film material in a first direction, a marking unit configured to mark a nulling mark or material information in a marking area of the optical film material fed in the first direction, other than a valid area which is attached to a display panel, a light source unit having a light source member configured to supply a marking laser light to the marking unit, and a receiving roll configured to collect the optical film material.

12 Claims, 7 Drawing Sheets

(51) Int. Cl.
 *B41J 2/47* (2006.01)
 *G02B 5/30* (2006.01)
(58) Field of Classification Search
 CPC .......... G02B 5/30; G02B 6/42; G02B 6/4224; G01N 21/8806; G01N 21/89; G01N 21/8901; G01N 2021/8825; G01N 2021/888
 See application file for complete search history.

(56) References Cited

U.S. PATENT DOCUMENTS

| | | |
|---|---|---|
| 2006/0164647 A1 | 7/2006 | Shibata |
| 2007/0099021 A1 | 5/2007 | Kashima et al. |
| 2009/0009864 A1* | 1/2009 | Kobayashi ........... G01N 21/958 359/485.02 |
| 2012/0058291 A1* | 3/2012 | Kitagawa ............. G02B 5/3033 428/43 |
| 2012/0182636 A1 | 7/2012 | Seibert et al. |
| 2014/0375794 A1 | 12/2014 | Singh |

FOREIGN PATENT DOCUMENTS

| | | |
|---|---|---|
| CN | 103832873 A | 6/2014 |
| CN | 104249217 A | 12/2014 |
| JP | 2002067188 A | 3/2002 |
| JP | 2006-290535 A | 10/2006 |
| JP | 2008201507 A | 9/2008 |
| JP | 2010076181 A | 4/2010 |
| JP | 2013184171 A | 9/2013 |
| JP | 2015189051 A | 11/2015 |
| KR | 10-2007-0014559 A | 2/2007 |
| KR | 10-1531676 B1 | 6/2015 |
| KR | 10-2015-0078860 A | 7/2015 |
| KR | 10-2015-0078861 A | 7/2015 |

* cited by examiner

SYSTEM AND METHOD FOR MARKING AT OPTICAL FILM

TECHNICAL FIELD

The present disclosure relates to a system and method for marking at a partial area of an optical film material.

This application is a National Stage Entry of International Application No. PCT/KR2017/000227 filed on Jan. 6, 2017, and claims the benefit of Korean Application No. 10-2016-0040290 filed on Apr. 1, 2016, all of which are hereby incorporated by reference in their entirety for all purposes as if fully set forth herein.

BACKGROUND ART

Among displays used in the art, CRT (cathode ray tube) has been frequently used for a TV and a monitor of measurement devices, information terminals or the like, but CRT is not capable of actively coping with the demands on smaller size and light weight of electronic devices due to its large size and great weight.

In order to substitute for the CRT, a liquid crystal display has been actively developed due to its small size and light weight, and is being recently in increasing demand enough to play a role as a flat plate display.

In order to implement an image, a liquid crystal display used optical anisotropy and polarizing property of liquid crystal. The liquid crystal has an elongated molecule structure and also exhibits anisotropy which gives directivity in arrangement, and when being placed in an electric field, the liquid crystal exhibits a polarizing property since the orientation of molecule arrangement is changed depending on its size. The liquid crystal display essentially includes a liquid crystal panel made of a pair of transparent insulating substrates respectively having electric field generating electrodes formed at facing sides with a liquid crystal layer being interposed between them. Here, the arrangement orientation of liquid crystal molecules are artificially adjusted by changing the electric field between the electric field generating electrodes, and various images are displayed using the penetration ratio of light which varies at this time.

Polarizing films serving as an optical film for visualizing the change of liquid crystal orientation of a liquid crystal display are respectively located at upper and lower portions of the liquid crystal panel. The polarizing film allows light having a polarization component coincident with the transmitting light to pass, and the degree of light transmission is determined by means of an arrangement of transmission axes of two polarizing films and an arrangement characteristic of liquid crystal.

A polarizing film includes a polarization layer having a polarization axis formed to change a polarization characteristic of light and prepared by stretching PVA (polyvinyl alcohol) absorbing iodine serving as a polarizer with strong tension, first and second TAC films (tri-acetate cellulose films) formed at both sides of the polarization layer to protect and support the polarization layer, a protecting film formed at one side of the first TAC film to prevent the surface of the polarization layer from being damaged, and a releasing film formed at one side of the second TAC film by means of adhesive.

In order to make the polarizing film, raw material rolls respectively formed by winding a PVA film, TAC films (a first TAC film and a second TAC film), a protecting film and a releasing film are prepared using a film making device, the raw material rolls are preprocessed by washing in a washing bath and drying in a drying oven, then the first TAC film and the second TAC film are laminated on both sides of the PVA film and also the PVA film is stretched to form an intermediate roll, and then a protecting film is laminated on the surface of the first TAC film and also a releasing film is laminated on the surface of the second TAC film with an adhesive being interposed between them to form a polarizing film roll.

FIG. 1 is a schematic view showing a winding process of a general optical film material, FIG. 2 is a diagram showing that the optical film material is inclined to one side, and FIG. 3 is an enlarged cross-sectional view showing an area A1 of FIG. 2. Referring to FIGS. 1 to 3, a polarizing film f supplied from a rewinder 2 is wound on a winder 3 after intermediate processes. At this time, the winder 3 winds the polarizing film f with a high winding tension in order to prevent the polarizing film f from being inclined to one side or released and thus being wrinkled during the winding process.

However, in spite of high winding tension, the polarizing film f may be inclined to one side as shown in FIG. 2 due to external environments or workers.

In addition, if alien impurities O are placed in the polarizing film f while the polarizing film f is being wound on the winder 3 as shown in FIG. 3, due to the pressure of a polarizing film region located at an upper portion of the polarizing film f wound with high winding tension, polarizing film regions located above and below the impurities O may be pressed, which may damage the polarizing film f.

DISCLOSURE

Technical Problem

The present disclosure is directed to providing a system for marking at an optical film, which may minimize pressing of an optical film material and allows material information to be marked on the optical film material, and a method for marking at an optical film using the same.

The present disclosure is not limited thereto, and other objects not mentioned herein would be clearly understood by those having ordinary skill in the art.

Technical Solution

In one aspect of the present disclosure, there is provided a system for marking at an optical film material.

According to an embodiment of the present disclosure, the system for marking at an optical film may comprise: a feed roll configured to feed an optical film material in a first direction; a marking unit configured to mark a nulling mark or material information in a marking area of the optical film material fed in the first direction, other than a valid area which is attached to a display panel; a light source unit having a light source member configured to supply a marking laser light to the marking unit; and a receiving roll configured to collect the optical film material.

In an embodiment, the marking area may have a length direction formed along the first direction in an area of the optical film material and also have edge areas at both sides except for the valid area located at a width center of the optical film material, and the marking unit may form protrusions protruding in an upper direction of the optical film material while marking the nulling mark or the material information at the optical film material.

In an embodiment, the nulling mark may have a predetermined pattern formed in the marking area along the first direction, and the material information may include production information of the optical film material and upper or lower surface information of the optical film material.

In an embodiment, the nulling mark may be formed in the marking area to be symmetric based on the valid area.

In an embodiment, the marking unit may include a reflection member configured to reflect the laser light irradiated from the light source member; a beam expander configured to amplify the size of the laser light transferred through the reflection member; a beam shaper configured to change a characteristic of the laser light transferred from the beam expander; and a marking member configured to irradiate the laser light to the optical film material so that a predetermined nulling mark or material information is marked at the optical film material by the laser light transferred from the beam shaper.

In an embodiment, there may be provided a plurality of the marking units located above the optical film material, and the plurality of marking units may be located spaced apart from each other by a predetermined distance along a second direction which is perpendicular to the first direction when being observed from the above.

In an embodiment, the light source unit may be provided in the number corresponding to the number of the marking units, and reflection mirrors are provided as the reflection members.

In an embodiment, the number of the marking units may be twice as many as the number of the light source units, a single light source member may provide the laser light to two marking units, a plurality of the reflection members may be provided, a beam splitter may be provided as any one of the plurality of the reflection members, and a reflection mirror may be provided as another.

In an embodiment, the light source unit may further include a control member configured to adjust an power of the laser light supplied from the light source member, and the control member may control the power of the laser light so that the heights of the protrusions are gradually lowered along a direction opposite to an advancing direction of the first direction as the optical film material is being carried in the first direction.

In an embodiment, the system for marking at an optical film may further include a controller configured to control a winding tension of the receiving roll.

The present disclosure provides a method for marking at an optical film material.

According to an embodiment of the present disclosure, the method marking at an optical film may include: forming protrusions protruding in an upper direction of an optical film material while marking a nulling mark or material information in a marking area of the optical film material fed in a first direction, other than a valid area which is attached to a display panel, wherein the marking area has a length direction formed along the first direction in an area of the optical film material and also has edge areas at both sides except for the valid area located at a width center of the optical film material.

In an embodiment, the nulling mark may have a predetermined pattern formed in the marking area along the first direction, and the material information may include production information of the optical film material and upper or lower surface information of the optical film material.

In an embodiment, the nulling mark may be formed in the marking area to be symmetric based on the valid area.

In an embodiment, when the optical film material is being carried in the first direction, an power of a laser light may be controlled so that the heights of the protrusions are gradually lowered along a direction opposite to an advancing direction of the first direction.

Advantageous Effects

According to an embodiment of the present disclosure, since a partial area of an optical film material is marked using a laser light, it is possible to minimize that the optical film material is inclined to one side during a winding process.

In addition, according to an embodiment of the present disclosure, since a partial area of an optical film material is marked using a laser light to form protrusions protruding upwards on the optical film material, it is possible to minimize that the optical film material is pressed during a winding process.

In addition, according to an embodiment of the present disclosure, since material information is marked in a partial area of the optical film material, the information of the optical film material may be easily observed.

The effects of the present disclosure are not limited to the above, and other effects not mentioned herein would be clearly understood from the specification and the accompanying drawings by those having ordinary skill in the art.

BEST MODE

Figure 1:
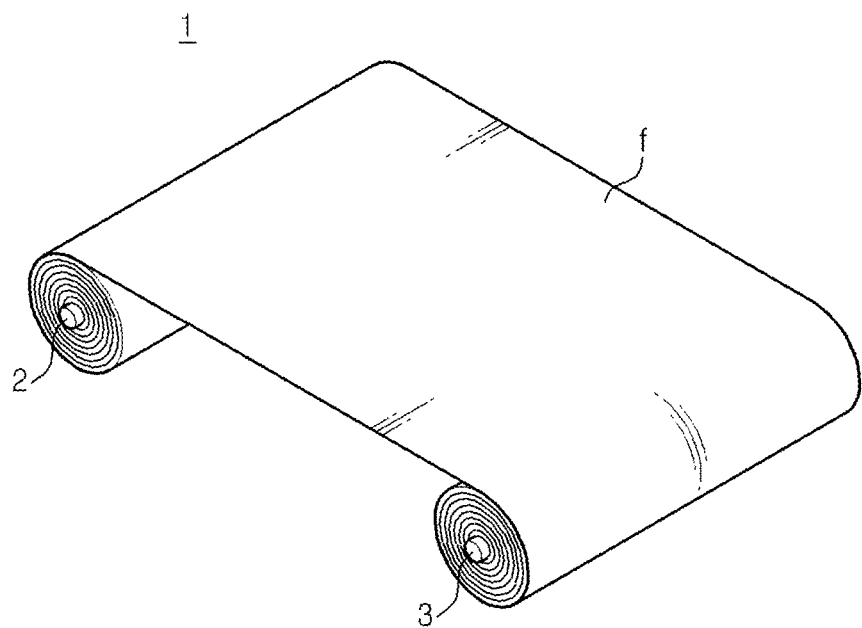
FIG. 1 is a schematic view showing a winding process of a general optical film material.
Figure 2:
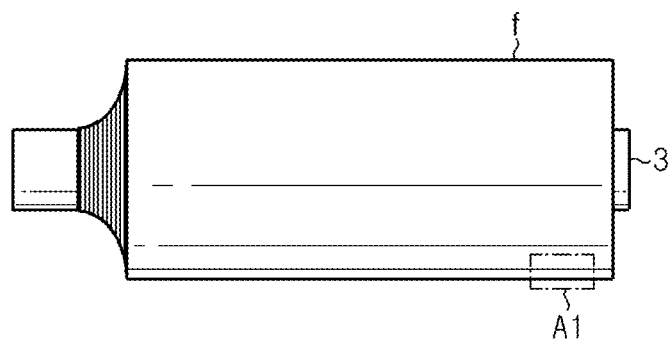
FIG. 2 is a diagram showing that the optical film material is inclined to one side.

Hereinafter, preferred embodiments of the present disclosure will be described in detail with reference to the accompanying drawings. The embodiments of the present disclosure can be modified in various ways, and the scope of the present disclosure should not be interpreted as being limited to the following embodiments. The embodiments are just provided for better understanding of the present disclosure to those having ordinary skill in the art. Therefore, the shape of each component in the drawings may be exaggerated for better explanation. In addition, the terms and words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

An optical film f of the present disclosure includes a polarizing film attached to a display panel.

Figure 4:
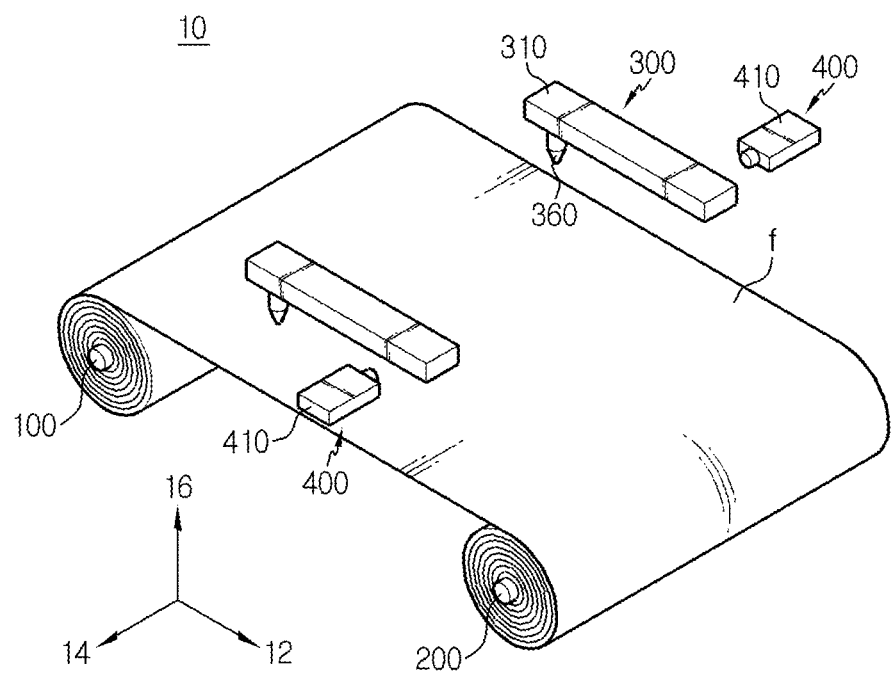
FIG. 4 is a perspective view schematically showing a system for marking at an optical film (hereinafter, also referred to as an "optical film marking system") according to an embodiment of the present disclosure.
Figure 5:
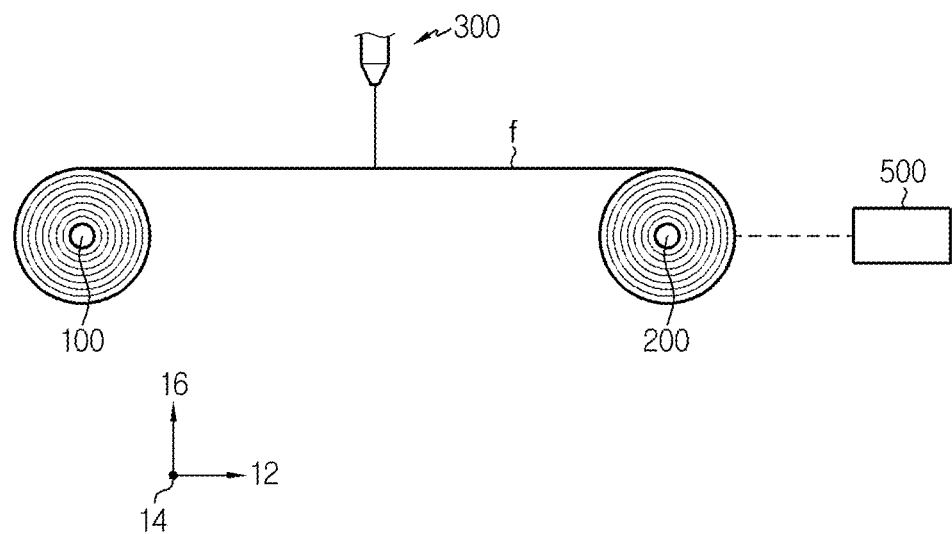
FIG. 5 is a front view showing the optical film marking system of FIG. 4.

FIG. 4 is a perspective view schematically showing a system for marking at an optical film (hereinafter, also referred to as an "optical film marking system") according to an embodiment of the present disclosure, and FIG. 5 is a front view showing the optical film marking system of FIG. 4. Referring to FIGS. 4 and 5, an optical film marking system 10 is for marking at a partial area of an optical film f material. The optical film marking system 10 includes a feed roll 100, a receiving roll 200, a marking unit 300, a light source unit 400 and a controller 500.

The feed roll 100 feeds an optical film f material for the process of making an optical film f. The feed roll 100 is provided in a generally cylindrical shape. The feed roll 100 is rotatable in one direction. For example, the feed roll 100 rotates in a clockwise direction to feed the optical film f material. Different from this, the feed roll 100 may also rotate in a counterclockwise direction to feed the optical film f material. Optionally, the rotating direction of the feed roll 100 may be determined depending on the direction in which the optical film f material is supplied.

The optical film f material is fed along its length direction. Here, the direction in which the feed roll 100 feeds and carries an optical film f material is called a first direction 12, the direction perpendicular to the first direction 12 when being observed from the above is called a second direction 14, and the direction perpendicular to both the first direction 12 and the second direction is called a third direction 16.

Initially, the feed roll 100 is provided in a state where an optical film f material is wound thereon. After that, the feed roll 100 rotates in a clockwise direction to feed the optical film f material in the first direction 12.

Though not illustrated in detail, the optical film f material fed from the feed roll 100 is wound on the receiving roll 200 after several processes.

The optical film f material is wound on the receiving roll 200 after a nulling mark NM or material information PM is marked in a marking area A of the optical film f material. The receiving roll 200 is provided in a generally cylindrical shape. The receiving roll 200 is located spaced apart from the feed roll 100 along the first direction 12 by a predetermined distance. The receiving roll 200 is provided to be rotatable in one direction. For example, the receiving roll 200 rotates in a clockwise direction to receive the optical film f material. Different from this, the receiving roll 200 may also rotate in a counterclockwise direction to receive the optical film f material. Optionally, the rotating direction of the receiving roll 200 may be determined depending on the direction in which the optical film f material is received.

Figure 3:
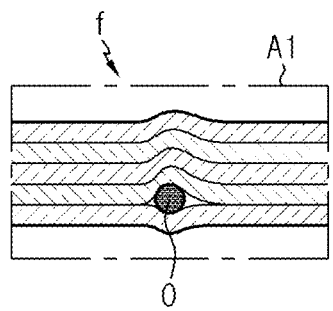
FIG. 3 is an enlarged cross-sectional view showing an area A1 of FIG. 2.
Figure 6:
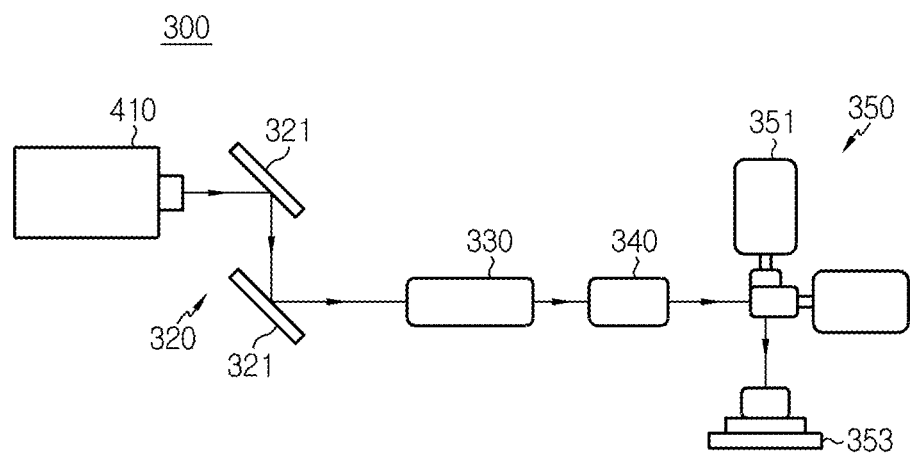
FIG. 6 is a schematic view showing a light source unit and a marking unit of FIG. 3.
Figure 7:
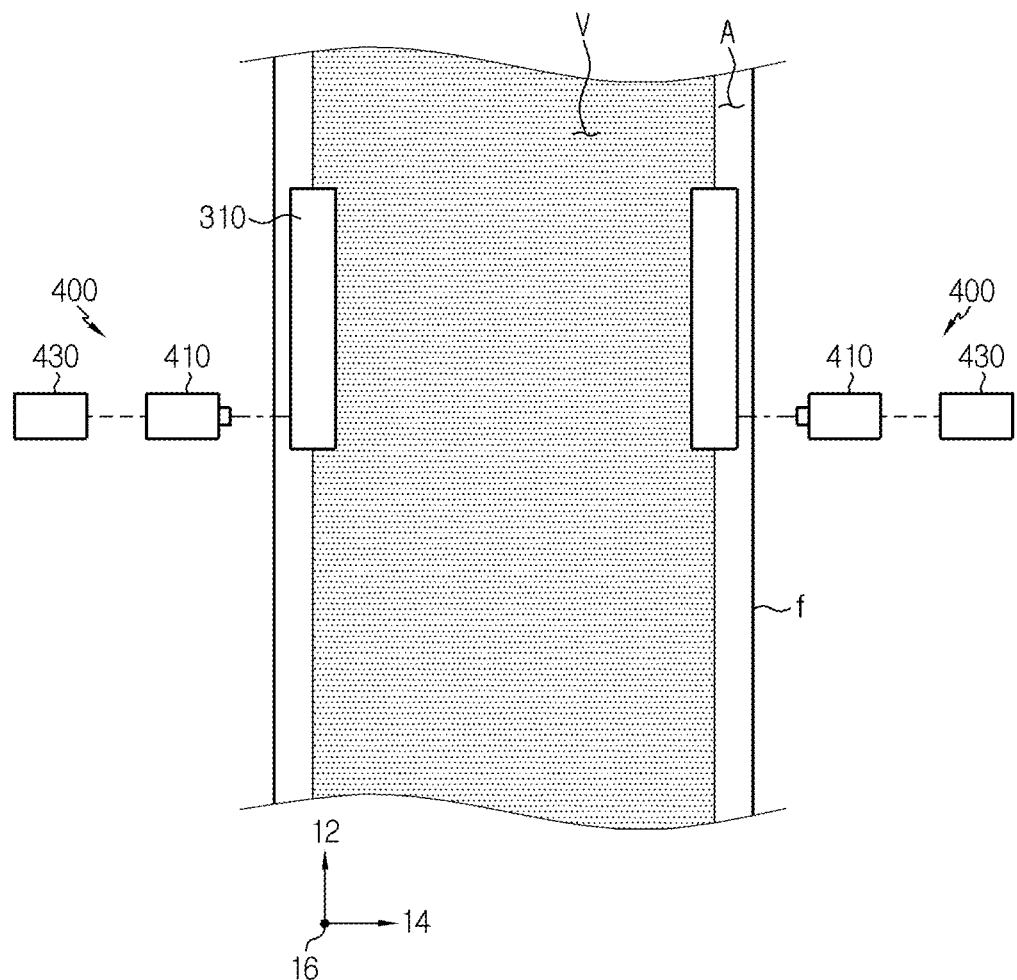
FIG. 7 is a plane view showing a part of the optical film marking system of FIG. 4.

FIG. 6 is a schematic view showing a light source unit and a marking unit of FIG. 3, and FIG. 7 is a plane view showing a part of the optical film marking system of FIG. 4. Referring to FIGS. 6 and 7, the marking unit 300 marks a nulling mark NM or material information PM in the marking area A of the optical film f material, other than a valid area V of the area of the optical film f material. Here, the valid area V means an area of the optical film f material which is attached to a display panel. The valid area V is formed to have a length direction along the first direction 12. The valid area V is located at a center in a width direction which is the second direction 14. The marking area A is formed along the first direction 12 which is a length direction of the area of the optical film f material. The marking area A includes edge areas at both sides, based on the valid area V of the optical film f material.

Figure 10:
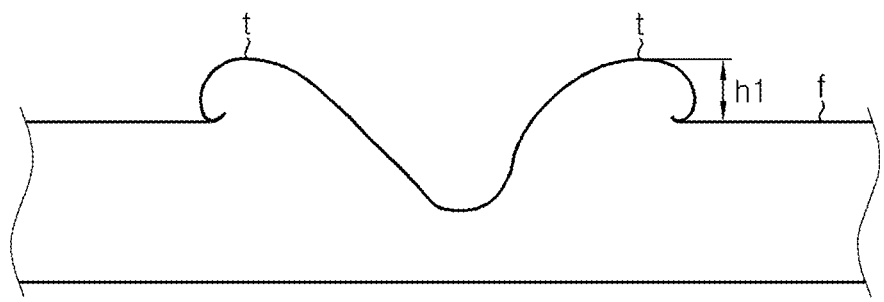
FIG. 10 is a cross-sectional view showing a protrusion formed on the optical film material.

FIG. 10 is a cross-sectional view showing a protrusion formed on the optical film material. Referring to FIG. 10, the marking unit 300 marks at the optical film f material by using a laser light. The marking unit 300 forms protrusions t protruding in an upper direction of the optical film f material. The marking unit 300 may form the protrusions t while generating the nulling mark NM or material information PM at the optical film f material. The protrusions t protrude in the third direction 16 based on the upper surface of the optical film f material. The protrusions t have predetermined heights h1 based on the upper surface of the optical film f material.

The protrusions t play a role of a guide so that the optical film f material is not inclined to one side while the optical film f material is being received to the receiving roll 200. In addition, when being stacked on the receiving roll 200, the protrusions t may keep a gap between layers consistently. The protrusions t may minimize that the optical film f material is damaged due to a pressing force of an optical film f material located above when any impurity is put thereto.

The heights h1 of the protrusions t are gradually lowered along a direction opposite to an advancing direction of the optical film f material by means of a control member 430, explained later. If the optical film f material is wound on the receiving roll 200 and thus stacked, an optical film f material layer located at a lower position in the third direction 16 is influenced by a pressing force of optical film f material layers located at upper positions. Thus, the heights h1 of the protrusions t are gradually lowered upwards in the third direction 16 so that heights h1 of the protrusions t at every layer are kept consistently when the optical film f material is stacked on the receiving roll 200.

The marking unit 300 is located above an area where the optical film f material is carried. A plurality of marking units 300 may be provided. In an embodiment, two marking units 300 may be provided. If two marking units 300 are provided, the marking units 300 are located above the optical film f material to be spaced apart from each other by a predetermined distance along the second direction 14. Two marking units 300 mark nulling marks NM or material information PM in the marking area A of the optical film f material, other than the valid area V. Different from the above, three or more marking units 300 may also be provided.

The marking unit 300 includes a frame 310, a reflection member 320, a beam expander 330, a beam shaper 340 and a marking member 350.

The reflection member 320, the beam expander 330, the beam shaper 340 and the marking member 350 may be located in the frame 310. The frame 310 is located above the optical film f material. The frame 310 has an inner space.

The reflection member 320 reflects the laser light supplied from the light source unit 400, explained later, toward the beam expander 330. A plurality of the reflection members 320 may be provided. For example, two reflection mirrors 321 may be provided as the reflection member 320. The reflection member 320 may reflect 100% of the laser light. For example, the reflection members 320 may be located to make the same reflection angle. For example, the reflection angle may be 45 degrees.

The beam expander 330 may change the size of laser light supplied from the light source unit 400. The beam expander 330 is located adjacent to the reflection member 320. For example, the beam expander 330 may change the laser light of the reflection member 320 into a larger or smaller beam. The beam expander 330 may be composed of two lens groups which match the focus locations.

The beam shaper 340 changes the characteristic of the laser light supplied from the light source unit 400. The beam shaper 340 is located adjacent to the beam expander 330. For example, when marking is performed at the optical film f using the laser light, the beam shaper 340 changes the characteristic of light so that the section of the marking is changed from a rounded shape into a substantially rectangular shape. The beam shaper 340 may convert the characteristic of the laser light passing through the beam expander 330 suitable for the marking quality.

The marking member 350 marks at the optical film f material by using the laser light supplied from the beam shaper 340. The marking member 350 includes a scanner 351 and a lens unit 353. The scanner 351 provides a nulling mark NM or material information PM to be marked at the optical film f material.

Figure 11:
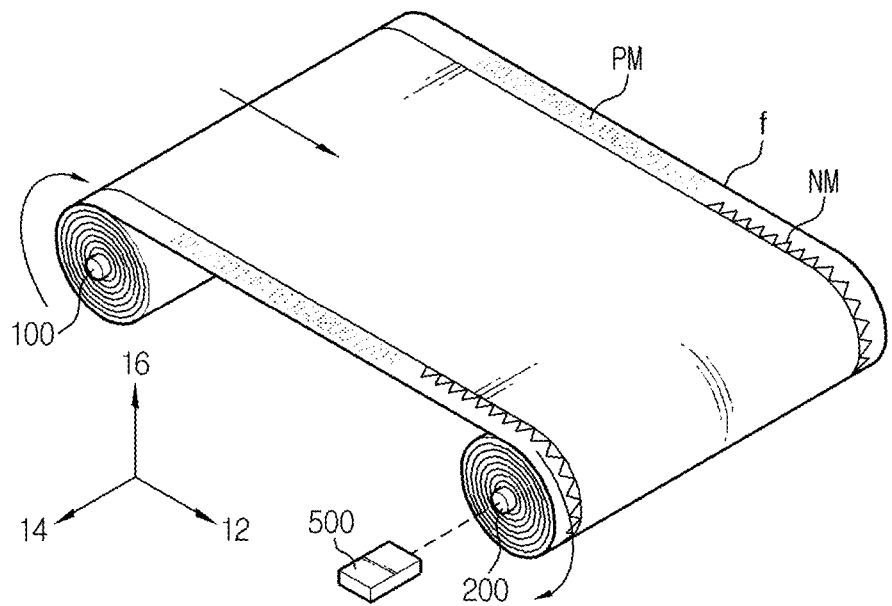
FIG. 11 is a schematic diagram showing a process of marking a nulling mark and material information at the optical film material.
Figure 14:
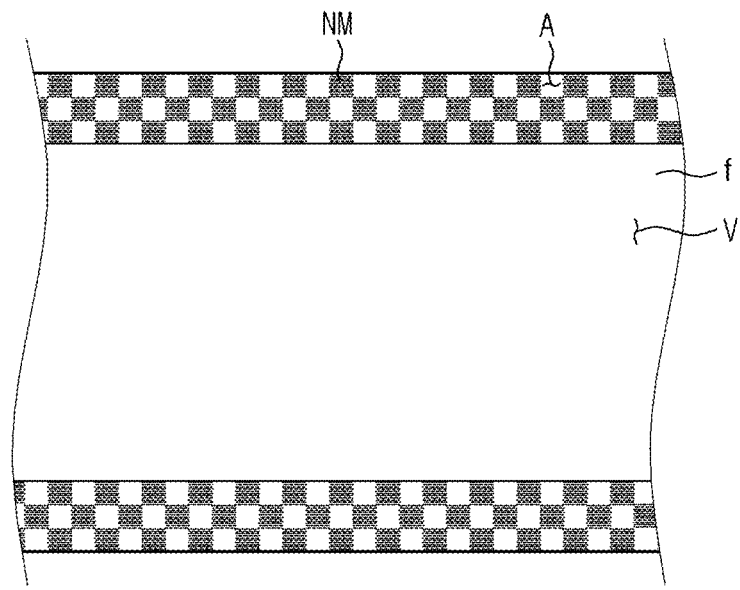
FIG. 14 is a diagram showing an example of the nulling mark marked at the optical film.

Here, the nulling mark NM means a predetermined pattern formed in the marking area A along the first direction 12. For example, as shown in FIG. 11, the nulling mark NM may have a zigzag shape. Different from this, as shown in FIG. 14, a plurality of rectangular patterns may be provided at regular intervals. The nulling mark NM may also be provided with various shapes such as a wave pattern, an arrow pattern, a linear pattern, a plurality of linear patterns or the like, without being limited to the above.

The nulling mark NM is formed in the marking area A to be symmetric based on the valid area V. In this case, two marking unit 300 may mark the same nulling mark NM at the marking area A.

The material information PM includes information of the optical film f material. For example, the material information PM include information of upper and lower surfaces of the optical film f material, right and left marks of the optical film f material, production information of the optical film f material, a product name of the optical film f material or the like. The production information may include production date, production place, production time or the like of the optical film f material. Here, the information of upper and lower surfaces of the optical film f material means marks displaying the upper and lower surfaces of the optical film material at both sides thereof. For example, a mark "upper" may be marked at the upper surface of the optical film material. Also, a mark "lower" may be marked at the lower surface of the optical film material. The mark showing the upper or lower surface of the optical film material may also be provided to any one of both surfaces.

The lens unit 353 concentrates the laser light transferred from the scanner 351 into a predetermined area so that the optical film f material may be precisely processed. For example, the lens unit 353 may be an f-theta lens. Different from this, the lens unit 353 may also be a telecentric f-theta lens. If the lens unit 353 is a telecentric f-theta lens, marking may be performed with better quality in the entire marking area.

The light source unit 400 supplies a laser light to the marking unit 300. The number of light source units 400 may be identical to the number of the marking units 300. The light source unit 400 includes a light source member 410 and a control member 430.

The light source member 410 supplies a laser light to the marking unit 300. The light source member 410 is located adjacent to the marking unit 300. The light source member 410 is located above the optical film f material. For example, the laser light of the light source member 410 may be a $CO_2$ laser. If the laser light is a $CO_2$ laser, the $CO_2$ laser may have a wavelength in the range of 9.0 μm to 11 μm. Preferably, the $CO_2$ laser may have a wavelength in the range of 9.2 μm to 9.7 μm or 10.4 μm to 10.7 μm. Different from this, the laser light may also be a CO laser. If the laser light is a CO laser, the CO laser may have a wavelength of 5 μm to 7 μm. Preferably, the CO laser may have a wavelength in the range of 5.7 μm to 6.1 μm. Selectively, the laser light may be a UV laser. If the laser light is a UV laser, the UV laser may have a wavelength of 200 nm to 400 nm. Preferably, the UV laser may have a wavelength in the range of 250 nm to 270 nm or 340 nm to 370 nm. Different from the above, the laser light may use any laser having a wavelength capable which may be absorbed to the optical film f.

Figure 15:
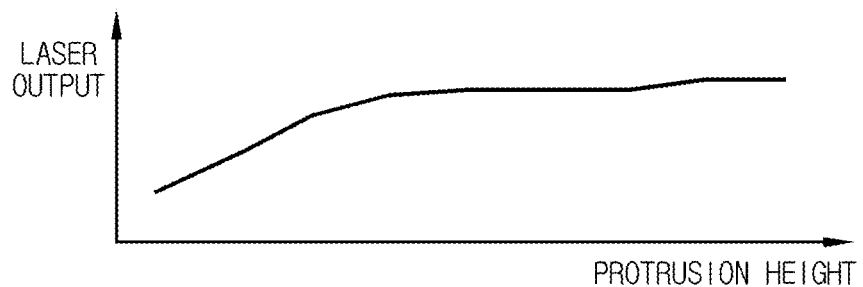
FIG. 15 is a graph schematically showing a height of the protrusion depending on laser output.

The control member 430 controls an power of the laser light supplied from the light source member 410. While the optical film material is being transferred to the first direction 12, the control member 430 controls the power of the laser light so that the heights h1 of the protrusions t are gradually lowered in a direction opposite to the advancing direction of the first direction 12. For example, if the power of the laser light is high, as shown in FIG. 15, the heights h1 of the protrusions t formed at the optical film f material are gradually raised. Thus, the control member 430 may controls the light source member 410 so that the power of the laser light is gradually lowered in a direction opposite to the advancing direction of the first direction 12 as the optical film f material is being carried in the first direction 12.

Figure 8:
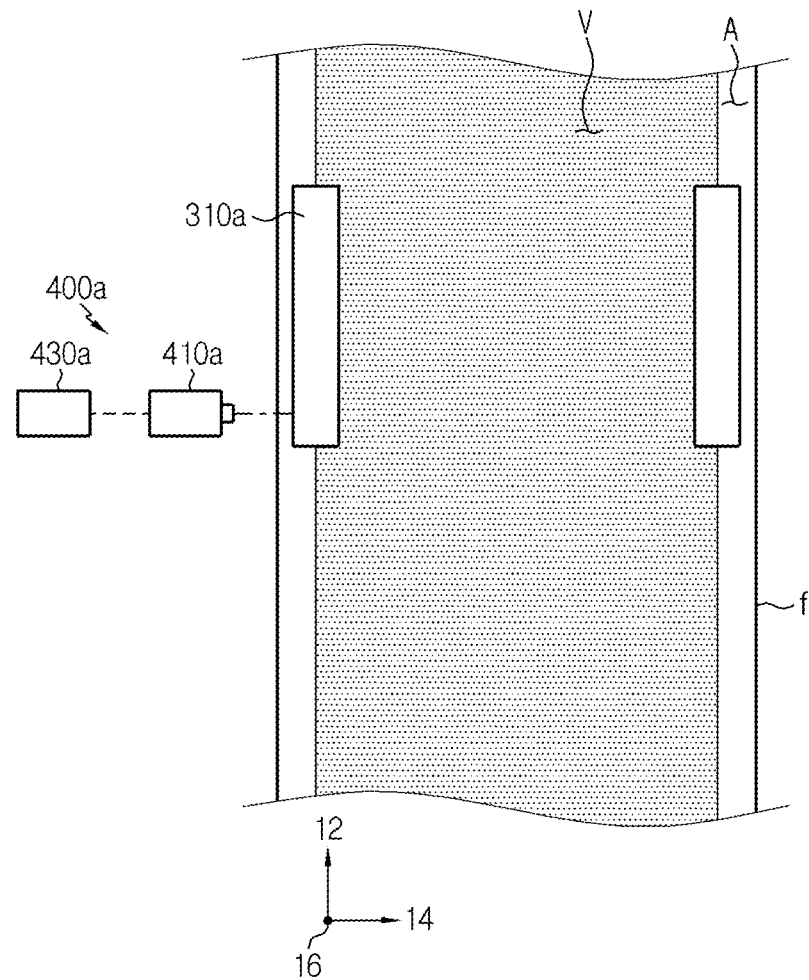
FIG. 8 is a diagram showing another embodiment of the optical film marking system of FIG. 7.
Figure 9:
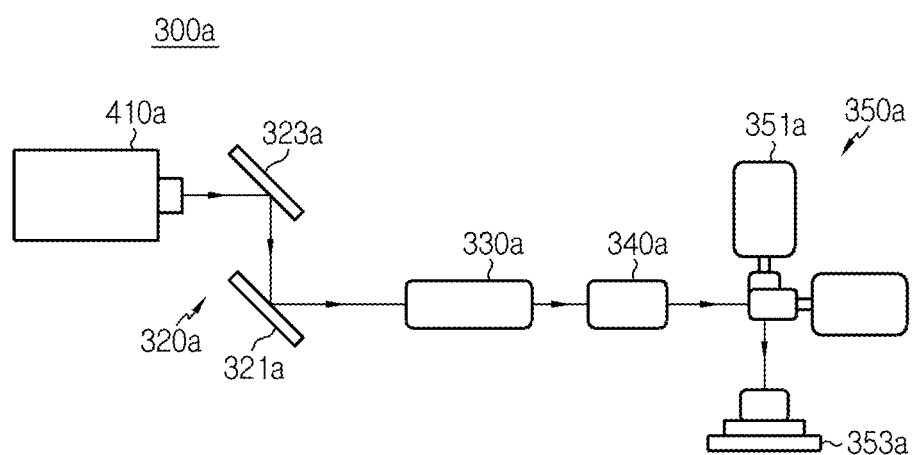
FIG. 9 is a diagram showing another embodiment of the marking unit of FIG. 4.

FIG. 8 is a diagram showing another embodiment of the optical film marking system of FIG. 7, and FIG. 9 is a diagram showing another embodiment of the marking unit of FIG. 4. Referring to FIGS. 8 and 9, a marking unit 300*a* of FIG. 9 is substantially identical to the marking unit 300 of FIG. 6. The reflection member 320*a* of FIG. 8 includes a beam splitter 323*a* and a reflection mirror 321. The beam splitter 323*a* may allow 50% of the laser light supplied from the light source member 410*a* to pass and reflect only 50% of the laser light toward the reflection mirror 321*a*.

The reflection mirror 321 reflects 99% to 99.9% of the laser light reflected by the beam splitter 323*a* to be supplied to the beam expander 330.

A light source unit 400*a* of FIG. 8 is substantially identical to the light source unit 400 of FIG. 7. However, a single light source member 410*a* provides the laser light to two marking units 300*a*.

Referring to FIG. 5, the controller 500 adjusts a winding tension of the receiving roll 200. The controller 500 controls the winding tension of the receiving roll 200 so that the optical film f material received by the receiving roll 200 is wound in a tight state. The controller 500 may minimize that the optical film f material received by the receiving roll 200 is inclined to one side, by adjusting the winding tension of the receiving roll 200.

Figure 12:
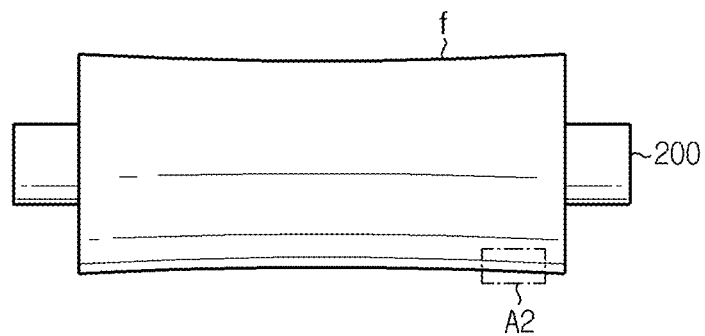
FIG. 12 is a diagram showing that the marked optical film material is wound on a receiving roll.
Figure 13:
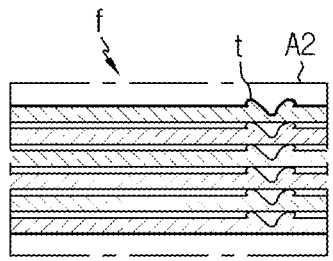
FIG. 13 is an enlarged cross-sectional view showing an area A2 of FIG. 12.

Hereinafter, the protrusions t formed at the optical film f material will be described in detail. FIG. 10 is a cross-sectional view showing a protrusion t formed on the optical film material, FIG. 12 is a diagram showing that the marked optical film material is wound on a receiving roll, and FIG. 13 is an enlarged cross-sectional view showing an area A2 of FIG. 12. Referring to FIGS. 10, 12 and 13, the protrusions t are formed at the optical film f material while the nulling mark NM or material information PM is being marked in a partial area of the optical film f material. Here, the protrusion t is defined as a portion protruding on the upper surface of the optical film f material. The protrusions t are formed to protrude in the third direction 16 based on the upper surface of the optical film f material. The protrusions t have predetermined heights h1.

The nulling mark NM means a predetermined pattern formed along the first direction 12 as described above. While the nulling mark NM is being formed in the marking area A of the optical film f material along the first direction 12, the protrusions t are also formed along the first direction 12 of the marking area A. In a state where the protrusions t are formed symmetrically in the edge areas of the optical film f material, the optical film f material is wound on the receiving roll 200.

The optical film f material wound on the receiving roll 200 form layers stacked on each other. In this process, the protrusions t regularly formed give predetermined spaces between the layers. The protrusions t play a role of a guide so that the optical film f material is not inclined to one side when the optical film f material is wound on the receiving roll 200. Thus, in a preferred embodiment, the protrusions t are formed in a border area between the valid area V and the marking area A.

In addition, since spaces are formed between stacked layers of the optical film f material wound on the receiving roll 200, even though any impurity is introduced to the optical film f material, it is possible to minimize that the optical film f material is pressed. Moreover, the power of the laser light is controlled by means of the control member 430, the heights h1 of the protrusions t are gradually lowered in a direction opposite to the advancing direction of the optical film f material. When the optical film f material is wound on the receiving roll 200 and stacked, an optical film f material layer located at a lower position in the third direction 16 is influenced by a pressing force of optical films f located at upper positions. Thus, the heights h1 of the protrusions t are gradually lowered upwards in the third direction 16 so that heights h1 of the protrusions t at every layer are kept consistently as shown in FIG. 13 when the optical film f material is stacked on the receiving roll 200. If the heights h1 of the protrusions t are kept consistently, in a state where the optical film f material is wound on the receiving roll 200, an optical film f material located at an upper portion gives a downwardly pressing force. For this reason, if the heights h1 of the protrusions t are identical to each other, the heights h1 of the protrusions t at optical film f materials located at a lower portion become lowered due to the influence of the pressing force in the third direction 16.

Meanwhile, if a protrusion t formed at the optical film f material in a lower portion is formed to have a higher height h1, when the optical film f material is stacked, the heights h1 of the protrusions t of every layer of the stacked optical film f material may be consistent with each other.

Since the optical film f material layers are stacked on each other with the same height h1, even though any impurity is introduced during the process, it is possible to minimize the occurrence of the pressing phenomenon around the impurity.

Hereinafter, a method for marking at an optical film f material will be described. FIG. 11 is a schematic diagram showing a process of marking a nulling mark NM and material information PM at the optical film material. Referring to FIG. 11, the optical film f material fed from the feed roll 100 is transferred in the first direction 12. While the optical film f material is being carried in the first direction 12, the marking unit 300 marks the nulling mark NM or material information PM. For marking, the marking unit 300 irradiates the laser light supplied from the light source unit 400 to the marking area A of the optical film f material. A plurality of marking units 300 performs marking successively along the first direction 12 to the optical film f material which is carried in the first direction 12. For example, the plurality of marking units 300 may mark the nulling mark NM and the material information PM simultaneously. Though not shown in the figures, several marking units 300 may be provided above the optical film f material to mark the nulling mark NM and the material information PM.

After the marking process is completed, the optical film f material is wound on the receiving roll 200. While the optical film f material is being wound on the receiving roll 200, the winding tension may be controlled by means of the controller 500 to minimize that the optical film f material is inclined to one side. In addition, by means of the protrusions t formed at the optical film f material, it is possible to minimize that the optical film f material is inclined to one side.

The above description illustrates the present disclosure. In addition, the above contents explain a preferred embodiment of the present disclosure, and the present disclosure may allow various combinations, modifications and environments. In other words, the present disclosure may be changed or modified within the scope of the concept of invention disclosed herein, the disclosed contents, their equivalents and/or the techniques and knowledge in the art. The disclosed embodiment shows a best state to implement the technical feature of the present disclosure, and this can be modified in various ways as demanded in the detailed fields and applications of the present disclosure. Therefore, the detailed description is not intended to limit the present disclosure as disclosed, but the appended claims should be interpreted as including other embodiments.

What is claimed is:

1. A system for marking at an optical film, comprising:
   a feed roll that feeds an optical film material in a first direction;
   a marking unit that marks a nulling mark or material information in a marking area of the optical film material fed in the first direction, other than a valid area which is attached to a display panel;
   a light source unit having a light source member that supplies a marking laser light to the marking unit; and
   a receiving roll that collects the optical film material,
   wherein the nulling mark has a predetermined pattern formed in the marking area along the first direction, and
   wherein the material information includes production information of the optical film material and upper or lower surface information of the optical film material.

2. The system for marking at an optical film according to claim 1,
   wherein the marking area has a length direction formed along the first direction in an area of the optical film material and also has edge areas at both sides except for the valid area located at a width center of the optical film material, and
   wherein the marking unit forms protrusions protruding in an upper direction of the optical film material while marking the nulling mark or the material information at the optical film material.

3. The system for marking at an optical film according to claim 1, wherein the nulling mark is formed in the marking area to be symmetric based on the valid area.

4. The system for marking at an optical film according to claim 1, wherein the marking unit includes:
   a reflection member reflects the laser light irradiated from the light source member;
   a beam expander that amplifies the size of the laser light transferred through the reflection member;
   a beam shaper that changes a characteristic of the laser light transferred from the beam expander; and
   a marking member that irradiates the laser light to the optical film material so that a predetermined nulling mark or material information is marked at the optical film material by the laser light transferred from the beam shaper.

5. The system for marking at an optical film according to claim 4,
   wherein a plurality of the marking units are located above the optical film material, and the plurality of marking units are spaced apart from each other by a predetermined distance along a second direction which is perpendicular to the first direction when being observed from the above.

6. The system for marking at an optical film according to claim 5,
   wherein the light source unit is provided in the number corresponding to the number of the marking units, and reflection mirrors are provided as the reflection members.

7. The system for marking at an optical film according to claim 5,
   wherein the number of the marking units is twice as many as the number of the light source units,
   wherein a single light source member provides the laser light to two marking units,
   wherein a plurality of the reflection members are provided, and
   wherein a beam splitter is provided as any one of the plurality of the reflection members, and a reflection mirror is provided as another.

8. The system for marking at an optical film according to claim 4,
   wherein the light source unit further includes comprises a control member configured that adjusts the power of the laser light supplied from the light source member, and
   wherein the control member controls the power of the laser light so that the heights of the protrusions are gradually lowered along a direction opposite to an advancing direction of the first direction as the optical film material is being carried in the first direction.

9. The system for marking at an optical film according to claim 8, further comprising:
   a controller that controls a winding tension of the receiving roll.

10. A method marking at an optical film, comprising:
    forming protrusions protruding in an upper direction of an optical film material while marking a nulling mark or material information in a marking area of the optical film material fed in a first direction, other than a valid area which is attached to a display panel,
    wherein the marking area has a length direction formed along the first direction in an area of the optical film material and also has edge areas at both sides except for the valid area located at a width center of the optical film material,
    wherein the nulling mark has a predetermined pattern formed in the marking area along the first direction, and
    wherein the material information includes production information of the optical film material and upper or lower surface information of the optical film material.

11. The method for marking at an optical film according to claim 10,
    wherein the nulling mark is formed in the marking area to be symmetric based on the valid area.

12. The method for marking at an optical film according to claim 10,
    wherein when the optical film material is being carried in the first direction, the power of a laser light is controlled so that the heights of the protrusions are gradually lowered along a direction opposite to an advancing direction of the first direction.

* * * * *